United States Patent [19]
Dalby et al.

[11] Patent Number: 6,002,440
[45] Date of Patent: Dec. 14, 1999

[54] VIDEO CODING

[75] Inventors: David Dalby, Bury St Edmunds; Richard James Whiting, Woodbridge; John Martin O'Donnell; Anthony Richard Leaning, both of Ipswich, all of United Kingdom

[73] Assignee: British Telcommunications public limited company, London, United Kingdom

[21] Appl. No.: 09/029,881
[22] PCT Filed: Dec. 1, 1997
[86] PCT No.: PCT/GB97/03296
§ 371 Date: Mar. 2, 1998
§ 102(e) Date: Mar. 2, 1998
[87] PCT Pub. No.: WO98/26604
PCT Pub. Date: Jun. 18, 1998

[30] Foreign Application Priority Data

Dec. 10, 1996 [GB] United Kingdom ............... 96308943

[51] Int. Cl.⁶ ............................... H04N 7/26; H04N 5/783
[52] U.S. Cl. ............................. 348/415; 386/110
[58] Field of Search ...................... 348/390, 405, 348/415, 416; 386/109, 110, 111, 112; H04N 7/26, 5/783

[56] References Cited

U.S. PATENT DOCUMENTS

| 5,712,946 | 1/1998 | Yanagihara | 386/111 |
| 5,717,816 | 2/1998 | Boyce | 386/111 |
| 5,751,893 | 5/1998 | Shimoda | 348/390 |

FOREIGN PATENT DOCUMENTS

| 0 691 788 | 1/1966 | European Pat. Off. . |
| 0 692 916 | 1/1996 | European Pat. Off. . |
| 0 693 858 | 1/1996 | European Pat. Off. . |
| WO 95 26108 | 9/1995 | WIPO . |

OTHER PUBLICATIONS

Niko Färber et al, "Robust H 263 Compatible Transmission for Mobile Video Server Access", IEEE COMSOC & EURASIP (Sep. 4–5, 1996).

Primary Examiner—Howard Britton
Attorney, Agent, or Firm—Nixon & Vanderhye P.C.

[57] ABSTRACT

A method and apparatus to encode a video signal representing a moving picture, the method comprising:
  receiving successive frames of a video signal;
  coding each frame of the video signal with reference to a preceding frame of the video signal, so generating a first set of data which, when reconstructed, represents a first playback mode of the moving picture;
  coding each frame of the video signal, where n is an integer, so generating a second set of data which, when reconstructed, represents a second playback mode of the moving picture;
  decoding the first set of data to produce a first reconstructed video signal;
  decoding the second set of data to produce a second reconstructed video signal;
  calculating the differences between a frame of the second reconstructed video signal and a frame of the first reconstructed video signal corresponding to the frame succeeding the frame of the second video signal and, when the differences exceed a threshold, coding the differences and so generating a further set of data.

15 Claims, 7 Drawing Sheets

VIDEO CODING

This invention relates to the encoding of video signals, in particular for transmission over low bandwidth transmission systems e.g. those that require less than 128 kbit/s.

Around 6 MHz of analogue bandwidth or a data rate in excess of 100 Mbit/s for digital information is required to transmit broadcast quality television signals uncompressed. Such high bit rate signals are impracticable to transmit by limited bandwidth systems. Therefore it is necessary to reduce the amount of information by compressing the video signal. This can be done by taking advantage of the correlation between neighbouring elements (pixels) of a picture and compromising between the reduction in data and the quality of the picture.

Video compression techniques rely on the correlation between neighbouring pixels, either in space and/or in time. For instance, in an area of a scene which is relatively uniform (for instance a wall of a room), the similarity of a pixel with neighbouring pixels within the area is likely to be fairly close. Similarly, in a fairly static scene, the pixels of one frame will correspond closely with the equivalent pixels of a subsequent frame. Hence pixels of a single frame can be coded with the respect of their relationship to each other (intra-frame coding) and/or with respect to their relationship with pixels of neighbouring frames (inter-frame coding). Intra-frame coded frames (intra-frames) can clearly be decoded without reference to any other frame whilst inter-frame coded frames (inter-frames) require information in relation to the frames used in the prediction. Differential techniques may also be used to compress video signals further. Differential coding techniques code only the differences between frames so meaning that less data is required than that required to encode the whole frame.

Various video compression standards have developed. One such is the International standard ISO-IEC11172 "Coding of Moving Pictures and Audio for Digital Storage Media at up to About 1.5 Mbit/s", known as MPEG1. This standard was developed for the storage of video and associated audio on digital storage media such as CD-ROM, digital audio tape (DAT), tape drives, writable optical drives or for transmission over telecommunications channels. According to the MPEG1 standard intra-frames are included in the data stream at regular intervals to allow random access to the video signal and editing thereof. The regular intra-frames also allow interaction with the video signal i.e. a user can request fast forward or fast reverse of a video signal and this may be accomplished by presenting the I frames of the video signal to the user until normal play is requested. However this increases the average bit rate per picture as compared to the normal play mode of the video signal which includes both intra- and inter-frames.

Standards relating to lower data rate systems have also evolved. For instance ITU standard H.261 relates to the coding of moving pictures at rates of n×64 kbit/s (where n is an integer from 1 up to 30) (for communication over an ISDN network) and ITU standard H.263 for coding moving pictures at data rates less than 64 kbit/s (for communication over a PSTN network). These encoding schemes do not require the regular inclusion of intra-frames. During the course of a video call, intra-frames are typically only transmitted if error conditions are detected by the receiver or possibly on scene changes. Whilst this means that the average data rate is reduced compared to MPEG1 (the data produced for intra-frames representing a significant proportion of the total data), it is not possible to provide interactive facilities such as fast forward or reverse since there are no clear access points to the data other than at the start. Thus H.261 and H.263 coding schemes are not suitable for providing video streams with which a user can interact.

In the article entitled "Robust H.263 Compatible Transmission for Mobile Video Server Access" by N Färber, E Steinbach and B Griod presented at the IEEE First International Workshop on Wireless Image/Video Communications held at Loughborough University in the UK on Sep. 4–5 1996 a method of allowing random access to an H.263 encoded video stream is described which does not require the overhead of periodic intra-frames. According to this article, two data streams are stored, one (a so-called P-stream) consisting of inter-frames which, in normal play mode, is transmitted. The second data stream (a so-called I-stream) consists of intra-frames. This is primarily used for error recovery but it is noted that random access of the video signals may be provided on request by the user by inserting intra-frames into the transmitted signal. Thus in normal use an inter-frame coded signal without periodical intra-frames is transmitted, intra-frames only being transmitted when random access to the video stream is required.

As acknowledged by the authors, the insertion of an intra-frame introduces a "mismatch" error which results from the difference between the frame reconstructed from the so-called P-stream and the frame reconstructed from the corresponding intra-frame. The author suggests that to reduce this error, the intra-frame is encoded from the reconstructed frame of the P-stream rather than from the original video signal.

According to the invention there is provided a method of encoding a video signal representing a moving picture, the method comprising:

receiving successive frames of a video signal;

coding each frame of the video signal with reference to a preceding frame of the video signal, so generating a first set of data which, when reconstructed, represents a first playback mode of the moving picture;

coding frames of the video signal, so generating a second set of data which, when reconstructed, represents a second playback mode of the moving picture;

decoding the first set of data to produce a first reconstructed video signal;

decoding the second set of data to produce a second reconstructed video signal;

calculating the differences between a frame of the second reconstructed video signal and a frame of the first reconstructed video signal corresponding to the frame succeeding the frame of the second video signal and, when the differences exceed a threshold, coding the differences and so generating a further set of data.

Thus, a frame reconstructed from the second and further set of data is a close match to a linked frame of the P-stream, without a significant increase in the bit rate per frame for an intra-frame being required.

Preferably the second set of data is generated without reference to any other frame of the video signal i.e. it is intra-frame coded. These I-frames may then be used to provide a fast forward and fast reverse facility.

The second set of data may be generated using a coarser quantisation step size than that used to generate the first set of data and the further set of data may be generated using a quantisation step intermediate that used to generate the first set of data and that used to generate the second set of data. Thus an intra-frame coded picture can be encoded without exceeding the maximum bits per picture and the further set of data improves the quality of the picture generated from second set of data.

Preferably the further set of data is combined with the frame of the second reconstructed video signal, the differences between such frame and the frame of the first video signal is calculated, and, when the differences exceed the threshold, the differences are coded, so generating a yet further set of data. Preferably these combining, calculating and coding steps are carried out iteratively until a criterion is met. Suitable criterion are either that the steps are carried out a fixed number of times e.g. twice for each frame of the second reconstructed video signal of until the differences are less that the threshold.

The invention will now be described further by way of example only with reference to the accompanying drawings in which.

Figure 1:
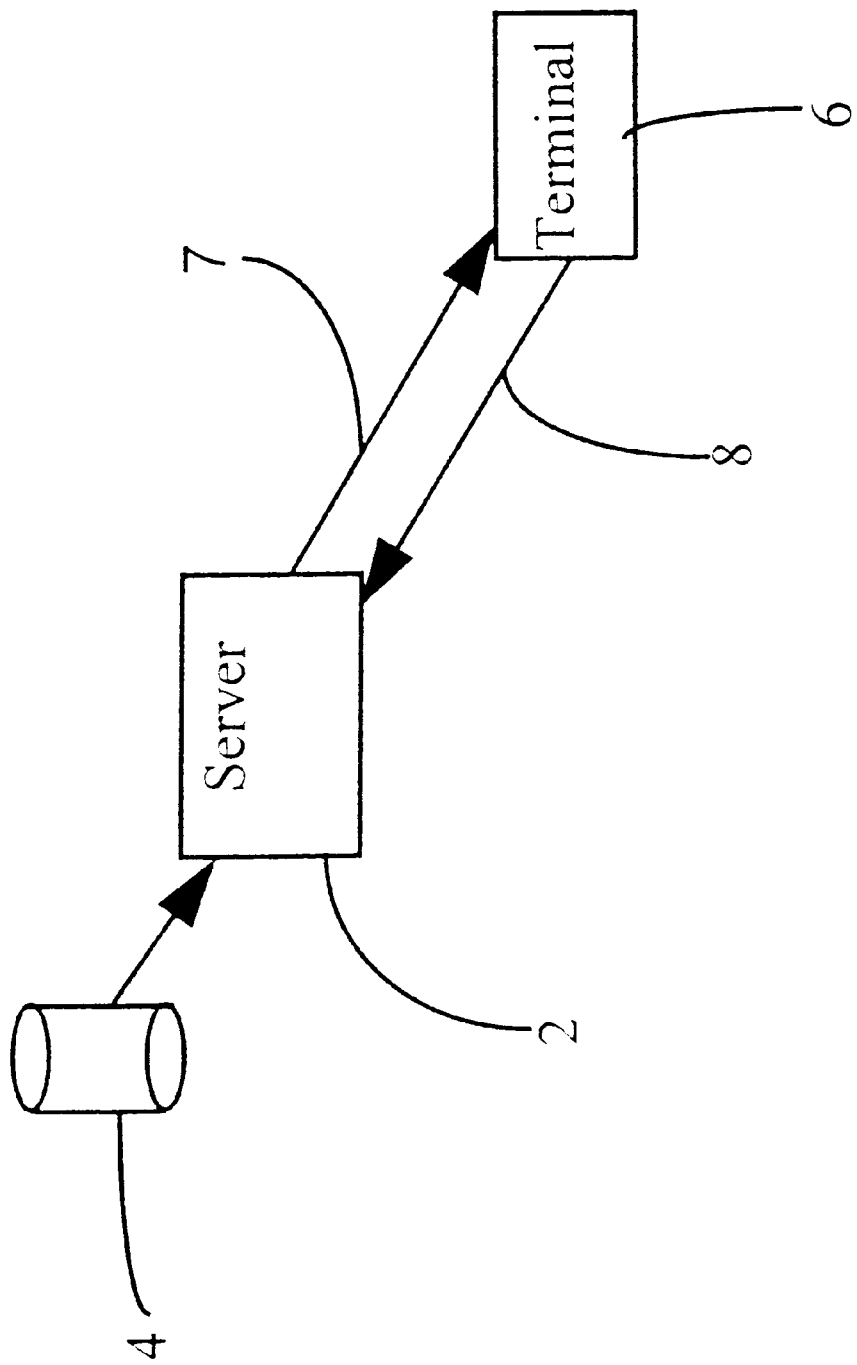
FIG. 1 shows an interactive visual services system including encoded video signals encoded according to the invention.

FIG. 1 shows an interactive video system such as a so-called video-on-demand system which provides bitstreams representing a video selected by a user on demand by the user. The system comprises a video server 2 which co-operates with a store 4 of encoded video signals representing moving pictures such as movies, documentaries etc. A plurality of user terminals 6 are connected to the video server 2 via transmission links 7 such as the PSTN, ISDN, radio satellite etc. Each user is provided with means (not shown) with which to control the video server 2. A return path 8 to the server is provided to transmit these control signals. This return path may be via the same transmission medium as that used to transmit the signals from the server 2 to the terminal 6 or a separate transmission medium.

In use, a user selects a moving picture to be played and a control signal is sent to the server via the return path 8. The server 2 ascertains the selected video signal, identifies the location of the video signal in the store 4, sets up a path 7 from the video store 4 to the requesting user terminal 6 and transmits the selected video signal to the terminal. Servers to provide this operability are known in the field of video-on-demand and will not be discussed further here unless the invention has particular effect on the server.

The video signals in the store 4 may be encoded according to any appropriate coding scheme.

Within the many current coding schemes, such as the H.261/263 and MPEG standards, there is a process known as quantisation to reduce the number of bits transmitted. The picture is transformed from the spatial domain into the frequency domain using a Discrete Cosine Transformation (DCT). The resulting data is scanned in an order of increasing frequency components after which it is quantised or divided by a fixed number; all those results of the division less than a threshold are discarded. The higher frequency components are usually of lower value than the lower frequency components so that, on division by a fixed number, many of the high frequency components are discarded. The number used as the divisor by the quantiser is chosen by the encoder to ensure that a reasonable number of frames are transmitted to the channel. For example, when there is a great deal of detail or movement in the video sequence to be encoded the encoder may increase the quantisation value to reduce the number of bits per frame (or macroblock) used to encode the signal. The use of a coarse quantiser has other unwanted effects; in the elements of the picture that are transmitted the decoded coefficient values have large steps, resulting in an image which has a low signal-to-noise ratio and appears 'blocky'.

Figure 2:
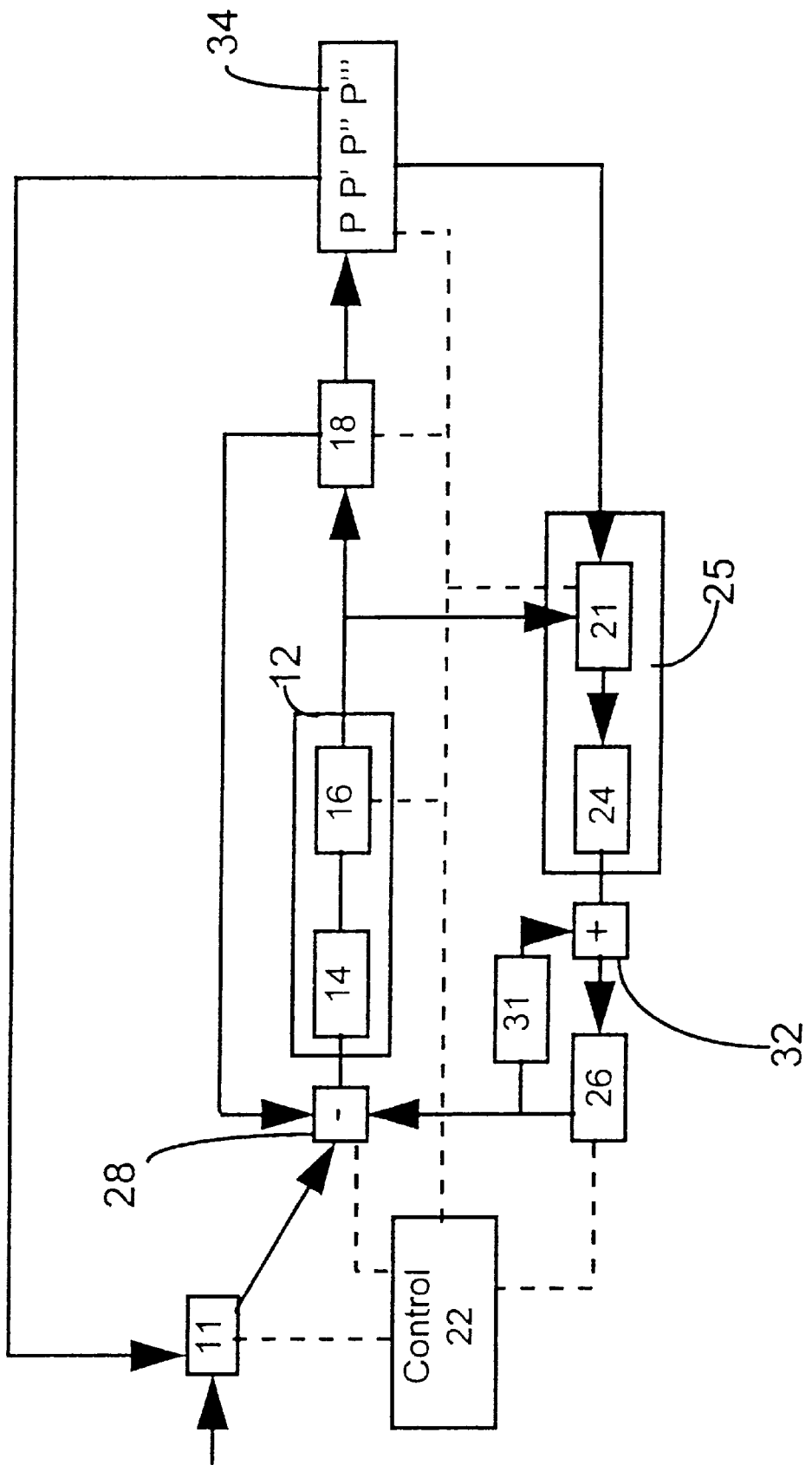
FIG. 2 shows a block diagram of a video encoder according to the invention.

A first embodiment of the invention will now be described with reference to FIG. 2 which shows an encoder according to the invention. The encoder comprises an input 11, an encoding means 12 in the form of a DCT calculating unit 14 which outputs DCT coefficients and a quantiser 16 which quantises the output of the DCT unit 14. The output of the quantiser 16 is connected to a variable length coder (VLC) 18 and also to an inverse quantiser 21. The quantisation step size of the quantiser 16 and the inverse quantiser 21 is controlled by a control unit 22. The VLC 18 is connected to the control unit 22 and passes information to the control unit relating to the state of operation of the VLC. The control unit modifies the quantisation step size of the quantiser 16 and the inverse quantiser 21 to keep the coded data within the maximum bits per picture limit allowed by the chosen coding scheme.

For this reason, not every frame of the video signal to be coded is necessarily encoded. The control unit 22 may cause frames to be dropped if the amount of data required to encode a frame becomes too great.

The inverse quantiser 21 and an inverse DCT unit 24 form a local decoder 25. In interframe coding the picture decoded by this local decoder is input to a frame store (FS) 26. When the next frame to be encoded is presented to the encoder at input 10, a subtractor 28 calculates the differences between the frame input to the encoder and the contents of the frame store 26. Motion estimation may also be carried out by a conventional motion estimator 31 and, if so, the contents of the frame store 26 are modified in accordance with the motion vectors. Such motion estimation is well known in the field of video coding and will not be discussed further herein.

In interframe coding, the contents of the frame store 26 are updated by adding the differences calculated by the subtracter 28 to the frame store 26, as indicated by adder 32. The output of the encoder is stored in a local store 34.

According to a first embodiment of the invention (which will be described with reference to FIG. 3) the encoding of a video signal requires several passes through the encoder:

1. A first pass to generate, according to the required coding scheme, a first set of data 10 corresponding to a normal playback mode bitstream. For instance in H.261 or H.263 coded video this bit stream will consist of an initial I frame followed by P frames. This first set of data 10 is stored in the local store 34.

2. A second pass to generate a second set of data 20 representing a second playback mode of the video signal e.g. fast forward or fast reverse. This pass generates an I frame sequence I'I'I' at a lower bit rate suitable for fast forward and reverse, together with entries in control lists of a control structure defining links to and from the first bitstream. The control unit 22 switches out the local decoder 25 from the encoding loop. The control unit is programmed to generate this second set of data at a bit rate that is compatible with the required fast forward/ fast reverse playback mode. For example, if a fast forward/fast reverse playback mode at 10 times the normal speed is required, the second set of data is generated at 1/10 times the average bit rate of the normal playback mode. The second set of data 20 is also stored in the local store 34 with the associated control lists.

3. Subsequent passes to generate additional P' P" and P'" frames 30. An I-frame of the second set of data 20 is used as the starting point for the P' P"P'" sequence and a decoded frame I' of the second set of data 20 is loaded into the frame store 26 by the control unit 22. The P frame in the encoded normal bitstream 10 (i.e. the one produced in pass #I) at the point at which it is to be rejoined is decoded and applied to the input 11 of the encoder as $P_{(n)}$. The subtractor 28 calculates the differences between the picture I' in the frame store 26 and the reconstructed target $P_{(n)}$ frame of the normal playback bitstream. If the differences between the two are less that a predetermined threshold then the encode process will be stopped. If greater than the threshold, the differences are encoded as P' and stored in the local store 34 as a third set of data. P' is then decoded and added to the frame store 26 by the adder 32 and the control unit again initiates the calculation, encoding and storage of the difference between the contents of the frame store and the frame $P_{(n)}$. This continues until the input to the encoder $P_{(n)}$ and the contents of the frame store 26 converge such that the differences between the two are less than the predetermined threshold. This data P',P", P'" is stored as third set of data. Thus a variable number of additional P' frames may be generated for each frame of the second playback mode.

In a simpler form of the invention the encoder can be run for a fixed number of frames to generate a fixed number of P' frames. Practical experience has shown that three P' frames, P' P" and P'" give acceptable results.

Thus a first set of data 10 representing the normal playback mode of a video signal is generated PPPPP . . . , together with a second set of data 20 representing a second playback mode (fast forward/fast reverse) I'I'I'I'I . . . and a further set of data 30 P', P", P'" allowing the normal playback mode bitstream 10 to be re-joined. These sets of data are stored in the local store 34 together with the associated control lists (to be discussed below) which record the links between the sets of data.

Figure 3:
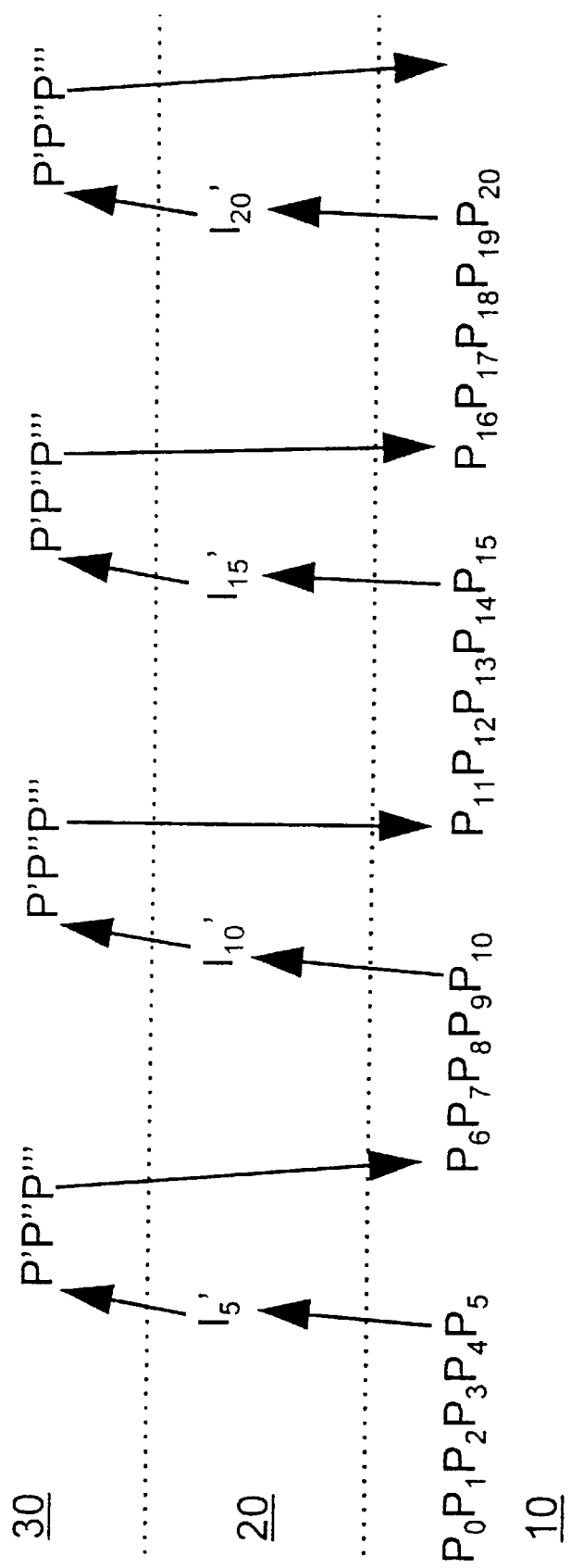
FIG. 3 shows data generated according to the invention, which enables fast forward and fast reverse.

The intraframes for the fast forward/fast reverse playback mode are encoded at a reduced bit rate compared to that of the normal playback mode bitstream. Differences between the I'-frame and the frame of the normal playback mode bitstream linked to the I'-frame are then encoded to form an additional P' frame. The control unit 22 of the encoder has the freedom, for each macroblock in any additional P' frame, to modify the quantiser step size in the following manner. The encoder adds additional P frames after each I' frame that has been encoded as shown in FIG. 3 as P' P" and P'" respectively. The number of P frames encoded after each I frame is programmable at the time the material is encoded and is not fundamental to the invention.

Thus each I' frame is encoded with a relatively coarse quantiser step size (e.g. level 8 in the H.261 coding scheme) to ensure that the number of bits that are transmitted to form the I' frame fall within the maximum number of bits/picture limit of the coding scheme. This I' frame when decoded and displayed will look slightly blurred and blocky. The following P frame, P', also uses a relatively coarse quantiser step size and is used to sharpen the image. It should be noted that the finer quantiser step sizes in the H.261 and H.263 specifications only allow for low pixel values. Thus to converge to the frame of the main bitstream with which the I' frame is (indirectly) linked, the I' frame in practice is followed by 2 or more additional P frames, P' and P", P'", to sharpen the picture to a level that is comparable to the degree of sharpness obtained by the main bitstream of P frames. The first frame P' has a quantiser step size that allows the full range of pixel values specified in the standard (e.g. level 8 in the H.261 coding scheme), the second frame P" has a finer quantiser step size (e.g. level 4 in the H.261 coding scheme) to achieve a picture quality comparable to that of the main bitstream. The lower range of pixel values is acceptable at this time as it is expected that the magnitude of any differences between the P' and P" frames is less than 255. A subsequent P' frame P'" uses an even finer quantisation step size (e.g. level 1 in the H.261 coding scheme).

Among the advantages of this technique are that, when fast forward or fast reverse is requested, there is a lower delay until the first frame I' is received by the terminal. Successive I' frames continue to be transmitted until a control signal requesting the server 2 to resume the normal playback mode is received from the user terminal 6. The additional P' frames associated with the final I' frame played are then transmitted to converge the signal to that represented by the next frame to be played from the normal bitstream. This technique can be extended to include any number of additional P frames after the I' frame with increasingly fine quantiser step size to converge to the optimum picture quality supported by the coding scheme.

The final additional frame P'" should have few differences from the normally encoded frame of the data 10 that it is linked to, as any differences will be perpetuated through the normal sequence of P frames that are transmitted for a considerable time. They will only be removed for a particular macroblock by the 'systematic update' process specified as a part of the H.261 and H.263 standards.

Thus, the coarsely quantised I' frames require fewer bits for transmission than standard I-frames of the MPEG or H.261 standards and therefore are transmitted with less delay. The subsequent additional P' frames remove the artifacts that result from the coarse quantisation and encode the large expected differences between the coarsely quantised I frame and the P' frame. The final P'" frame is quantised such that it is a good match with the normal bitstream.

This enables fast forward and fast reverse without introducing additional artifacts into the signal to be displayed which would then be perpetuated into the normal playback mode of the video signal. The speed up obtained in fast forward and fast reverse is defined at the time the sequence is encoded. If a high speed fast forward and fast reverse is required then there will be many P frames encoded between each I frame and there will be a noticeable amount of time between each I frame. For example, if the stored material is encoded at a mean bit rate of 128 kbit/s and a speed up factor of 10 times is required in fast forward and reverse, then the I' frames will be encoded at a mean bit rate of 12.8 kbit/s.

When a pause is requested the user's terminal could display the currently decoded frame. However when the decoded frame is maintained on the user's display, any artifacts in the picture will be more obvious to a viewer.

Alternatively therefore, the server 2 may continue to transmit the normal playback signal until the next link to an I' frame of the second set of data is reached. The I' frame and the subsequent P', P'" and P'" frames are then transmitted for display. However if the fast forward has been encoded at a rate that is much faster than the normal playback rate of the video signal than there may be a significant delay before the next I' frame is reached.

Figure 4:
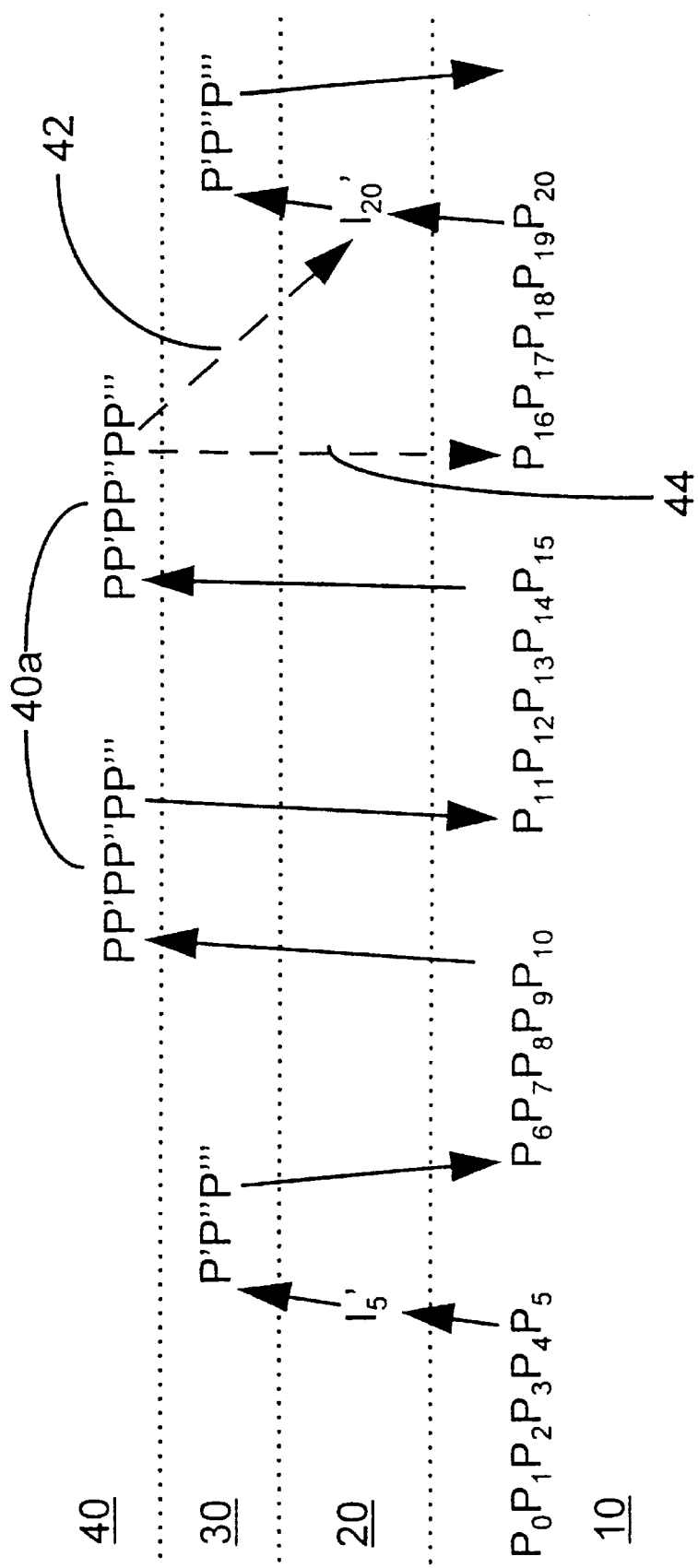
FIG. 4 shows data generated according to another embodiment of the invention which allows both fast forward and fast reverse and more frequent pause availability.

According to a second embodiment of the invention, a plurality of pause sequences PP',PP",PPP'" are encoded, relatively more frequently than the I frames for fast forward and fast reverse, as can be seen from FIG. 4. Each PP' pause sequence 40a is encoded by calculating the differences between a reconstructed frame $P_n$ of the normal playback mode and the corresponding frame $F_n$ frame of the original video signal. The pause sequences 40 are also stored in the store 34 as a further set of data.

The encoding process for pause sequences is similar to that used for the fast forward and fast reverse sequences except that, in this case, no initial I frame is generated:

1. The first set of data 10 corresponding to a normal playback mode bitstream is decoded and frames loaded into the frame store 26 of the encoder from the local store 34.

2. A further set of data 40 is generated representing a second playback mode i.e. pause. This further set of data is generated by inputting an original frame $F_{(n)}$ of the video signal into the encoder input 11 and loading the frame store 26 with the corresponding decoded frame of the main bit stream 10. The differences between the two frames are calculated and, if greater than a threshold, encoded and stored as pause frames PP' in the local store 34 with associated control lists.

3. PP' is then decoded and added to the frame store 26 by the adder 32 and the control unit again initiates the calculation of the difference between the contents of the frame store and the frame $F_{(n)}$. This continues until the input to the encoder $F_{(n)}$ and the contents of the frame store 26 converge such that the differences between the two are less than the predetermined threshold. Thus a variable number of PP' pause frames may be generated for each frame of the pause mode.

Clearly the final PP' frame generated has diverged from the corresponding frame in the normal bitstream 10. This may be dealt with in a number of ways:

a) an entry in the control list associated with the final PP' of a particular pause point is linked to the next I' frame to occur in a fast forward data set e.g. in FIG. 4 PP' is linked to $I'_1$ (as indicated by numeral 42 in FIG. 4); or b) further data is encoded to cause the picture represented by the pause frames PP' to converge to a reconstructed P frame in the normal playback bitstream 10. An entry in the link associated with the final PP' frame is thus linked to the next P frame, as indicated by numeral 44 in FIG. 4. In the same way as described with reference to the first embodiment, the decoded frame of the main bitstream 10 with which the pause point is to be linked (e.g. the next frame $P_{x+1}$) is input to the encoder via input 11 whilst the decoded final pause frame PP''' is loaded into the frame store 26. As for the first embodiment, the differences between the input frame $P_{x+1}$ and the contents of the frame store 26 are encoded to form play resume frames and associated control lists until the two inputs to the subtractor converge or until a fixed number of iterations have occurred.

Because interframes contain less bits than intraframes, the use of PP' frames alone for pause mode mean that more pause points may be inserted without a large increase in the volume of the video data stored on the server.

Audio-visual material from a variety of sources may be encoded, the encoded bitstream being stored on a high capacity storage system, typically a hard disc drive or CD-ROM for storage at a later stage in a store 4 of a video server 2.

Thus, in the invention, the encoding process occurs only at the time the material is processed and stored on the storage medium. The material may be stored at several rates that are required to support the transmission bandwidth and the terminal types that are to be supported. Typically the audio-visual material will be transmitted over PSTN, ISDN, LAN or ADSL networks and the encoding process is carried out for each required rate.

The stored material may be accessed by any client terminal 6 that is capable of decoding the encoded bitstreams plus the associated audio coding algorithms. A control channel 8 is required to enable control of the server to enable the fast forward, fast reverse, pause and other modes. Currently there is no ITU standard for this control mechanism. FIG. 1 shows such an arrangement.

At the time the audio-visual material is requested by a client terminal, the material may be streamed directly to the standards compliant terminal, with no additional decoding/encoding/re-coding processing required by the server. Thus a comparatively inexpensive server can support many simultaneous accesses to the stored material.

Figure 5:
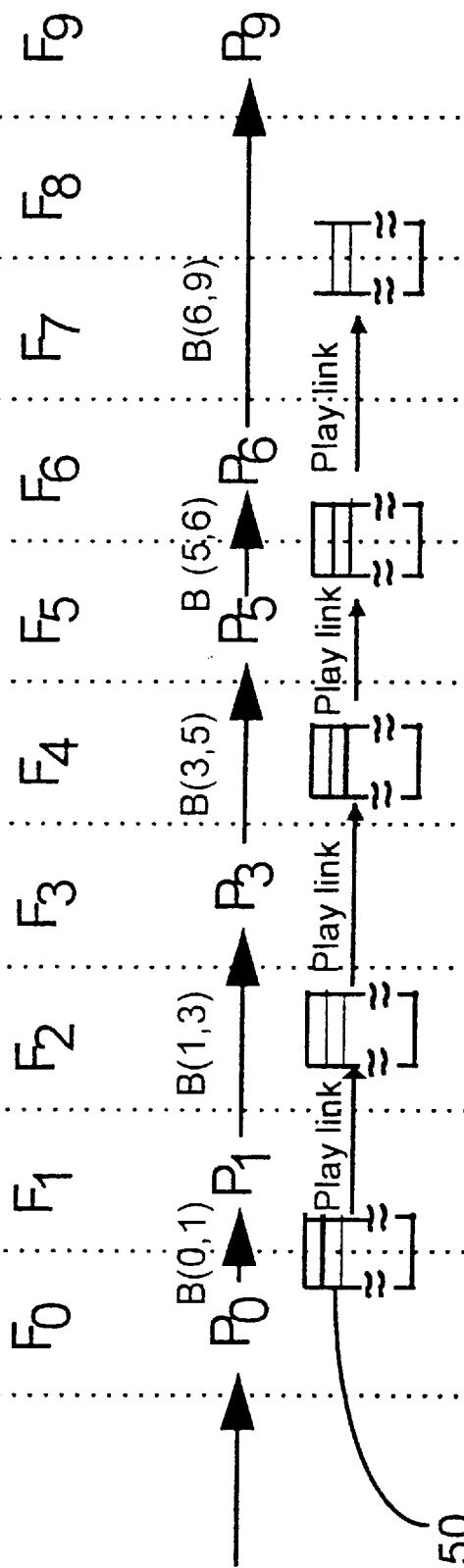
FIG. 5 shows how control lists are used in the play mode.

Commands from the client decoder are used to control the form of the bit stream that the server transmits. The constituents of the transmitted bitstream are controlled by control lists held on the server. In FIG. 5 F0 to F9 represent the original frames in the material to be encoded and occur at a fixed frame rate. Pn represent the normal playback mode predicted frames that will be reconstructed by a decoder and B(n, m) represents the bitstream that, when transmitted, enables the decoder to move from $P_n$ to $P_m$.

The control lists are generated during encoding and held on a storage medium for access by a server from the store 4. The control lists 50 contain links from the different frames held in the store. There is one control list for each element of bitstream, labelled B(0,1) to B(N,N+1). In FIG. 5 the video stream is shown following the 'play' link from one control list to the next.

Figure 6:
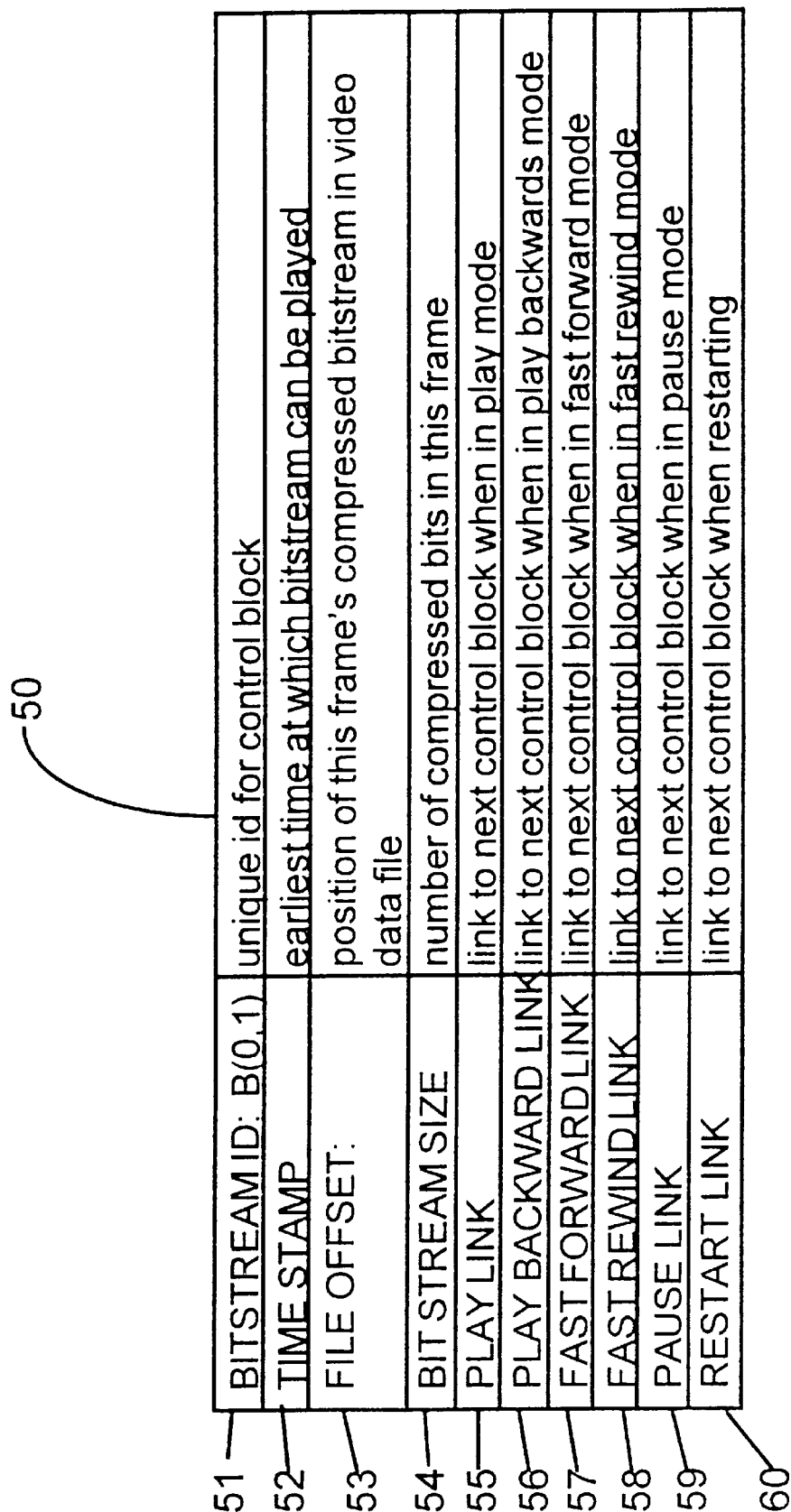
FIG. 6 is an example of elements of the control lists shown in FIG. 5.

An example of the elements in a control list is shown in FIG. 6. Each control list or block 50 includes: a bit stream identifier 51; a time stamp 52 which indicates the earliest time with respect to the start of the encoded signal at which a bit stream can be played out by a decoder; a file offset 53 which indicates the position of the frame's compressed bitstream in the store; a bit stream size 54 which indicates the number of bits in the frame; a play link 55 which indicates the identification of the next control list to be played in play mode; a play backward link 56 which indicates the identification of the next control list to be played in reverse play mode; a fast forward link 57 which indicates the identification of the next control list to be played in fast forward mode; a fast reverse link 58 which indicates the identification of the next control list to be played in fast reverse mode; a pause link 60 which indicates the identification of the next control block to be played in pause mode; and a restart link which indicates which indicates the identification of the next control list to be played when the play mode is resumed.

Figure 7:
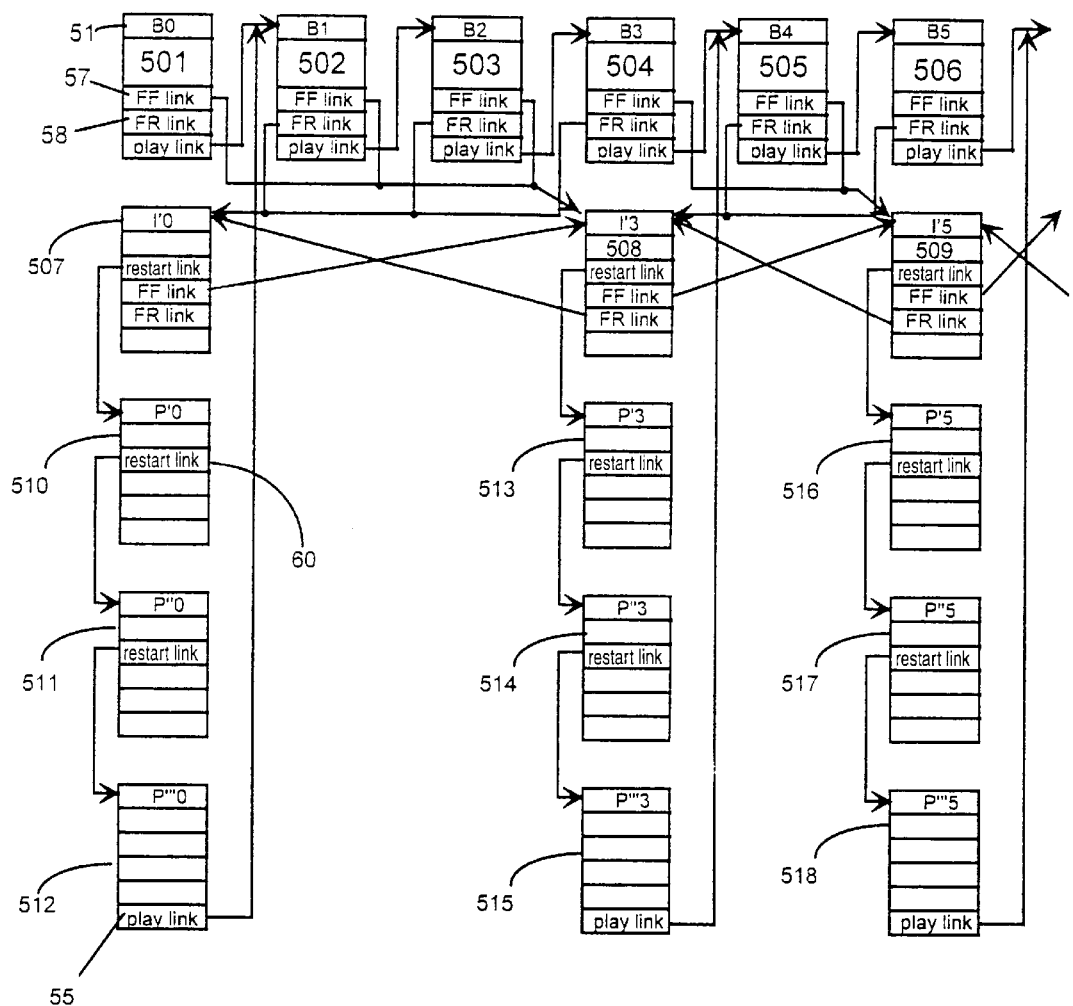
FIG. 7 is an example of how the control lists are used to generate a bitstream by a video server.

FIG. 7 shows the control lists 50 for a portion of an encoded video signal. Control lists 501–506 represent the P frames of the normal playback mode. Control lists 507–509 are associated with the I' frames generated for fast forward/fast rewind. Control lists 510–518 are associated with the additional P' frames generated to converge the fast forward picture to the rejoin point of the normal playback bitstream.

FIG. 7 does not show the pause sequences PP' however it will be appreciated that similar control lists are stored for this, and other, playback mode(s) also as required.

We claim:

1. A method of encoding a video signal representing a moving picture, the method comprising:

receiving successive frames of a video signal;

coding each frame of the video signal with reference to a preceding frame of the video signal, so generating a first set of data which, when reconstructed, represents a first playback mode of the moving picture;

coding each frame of the video signal, so generating a second set of data which, when reconstructed, represents a second playback mode of the moving picture;

decoding the first set of data to produce a first reconstructed video signal;

decoding the second set of data to produce a second reconstructed video signal;

calculating the differences between a frame of the second reconstructed video signal and a frame of the first reconstructed video signal corresponding to the frame succeeding the frame of the second video signal and, when the differences exceed a threshold, coding the differences and so generating a further set of data.

2. A method according to claim 1, wherein the second set of data is generated without reference to any other frame of the video signal.

3. A method according to claim 1, wherein the second set of data is generated using a coarser quantisation step size that used to generate the first set of data and the further set of data is generated using a quantisation step intermediate that used to generate the first set of data and that used to generate the second set of data.

4. A method according claim 1, further comprising combining the further set of data with the frame of the second reconstructed video signal, calculating the differences between such frame and the frame of the first video signal, and, when the differences exceed the threshold, coding the differences and so generating a yet further set of data, said combining, calculating and coding step being carried out iteratively until a criterion is met.

5. A method according to claim 4, wherein the criterion is that the steps are carried out twice for each frame of the second reconstructed video signal.

6. A method according to claim 4, wherein the criterion is that the differences are less than the threshold.

7. A method according to claim 1 wherein the second set of data represents a pause mode of the video signal, the pause mode being generated by iteratively encoding the differences between a decoded frame of the first set of data and the corresponding frame of the original video signal.

8. Video signal encoding apparatus comprising:

an input for receiving successive frames of a video signal encoding means and a quantiser for quantising the output of the encoding means;

an inverse quantiser for inverse quantising the output of the quantiser and decoding means for decoding the output of the inverse quantiser;

a subtractor for calculating the differences between a frame stored in a frame store and a frame input to the encoding apparatus, the encoding means being arranged to encode the differences, when the differences exceed a threshold, and so generate a further set of data;

control means arranged to control the inputting of a decoded inter-frame video signal into the encoding apparatus and the inputting of every frame of the video signal into the frame store, such that the frame of the video signal input to the encoder corresponds to a frame of the video signal succeeding the frame stored in the frame store and to control the quantiser and the inverse quantiser so as to modify the associated quantisation step size.

9. Apparatus according to claim 8 wherein the control means is arranged to modify the quantisation step size such that the video signal input to the frame store is generated using a coarser quantisation step size that used to generate the input to the encoder and the further set of data is generated using a quantisation step intermediate the two previously used quantisation step size.

10. Apparatus according to claim 8 wherein the video signal input to the frame store is generated without reference to any other frame of the video signal.

11. Apparatus according claim 8, the apparatus being arranged to combine the further set of data with the frame stored in the frame store to form a combined frame, to calculate the differences between such combined frame and the said frame of the video signal input to the encoder, and, when the differences exceed the threshold, to encode the differences and so generate a yet further set of data, the control means being arranged to cause said combining, calculating and coding step to be carried out iteratively until a criterion is met.

12. Apparatus according to claim 11, wherein the criterion is that the steps are carried out twice for each frame of the second reconstructed video signal.

13. A method according to claim 11, wherein the criterion is that the differences are less than the threshold.

14. Interactive video apparatus including apparatus as claim 8.

15. A video signal representing a moving picture, signal comprising:

a first set of data which, when reconstructed, represents a first playback mode of the moving picture;

a second set of data which, when reconstructed, represents a second playback mode of the moving picture; and a third set of data which represents the differences between a reconstructed frame of the second set of data and a reconstructed frame of the first set of data corresponding to the frame succeeding the reconstructed frame of the second set of data.

* * * * *